Figure 1:
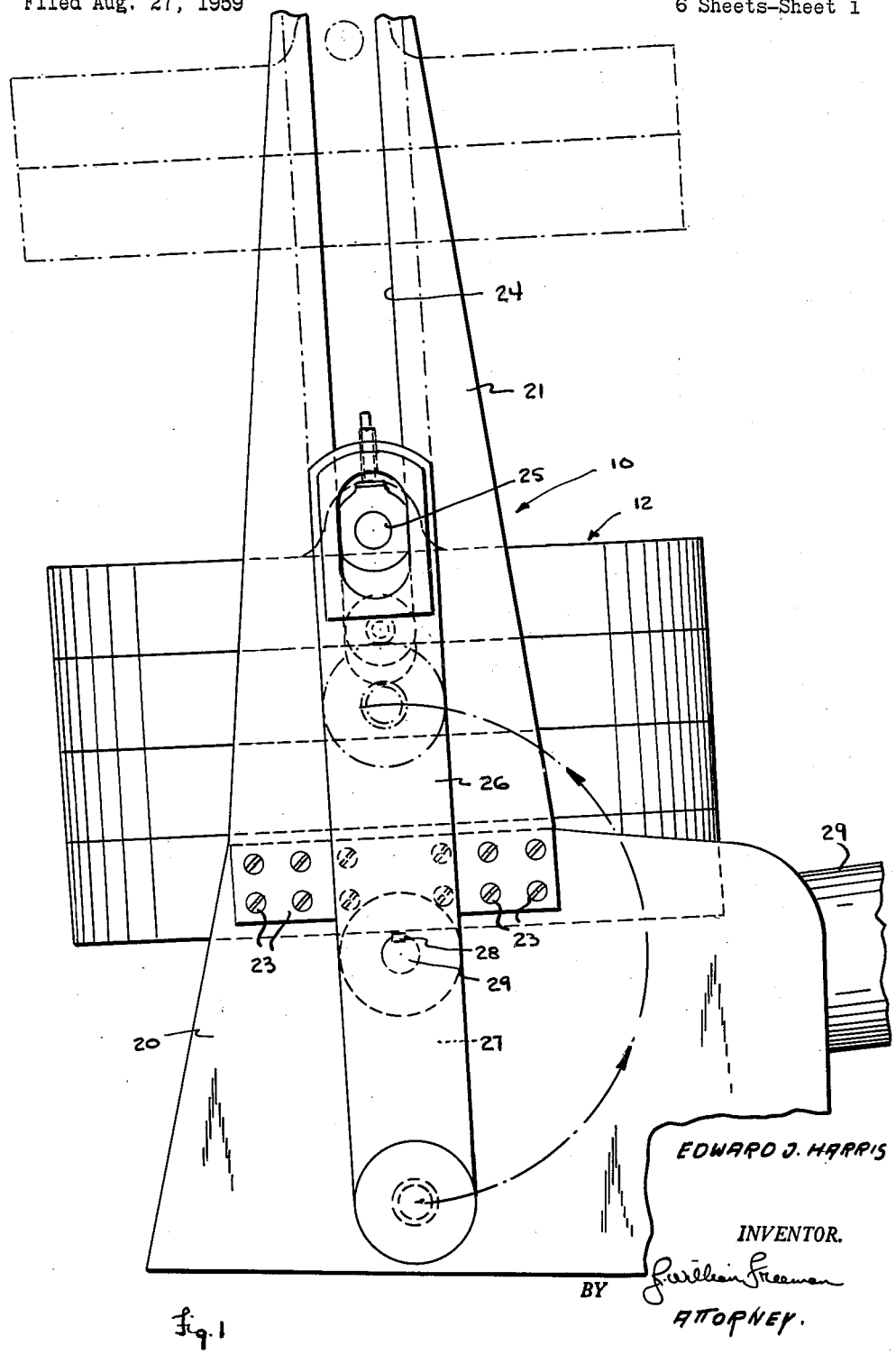

July 3, 1962

E. J. HARRIS 3,041,667

VULCANIZING PRESS

Filed Aug. 27, 1959

6 Sheets-Sheet 3

EDWARD J. HARRIS
INVENTOR.

BY William Freeman
ATTORNEY.

INVENTOR.
EDWARD J. HARRIS

July 3, 1962  E. J. HARRIS  3,041,667
VULCANIZING PRESS
Filed Aug. 27, 1959  6 Sheets-Sheet 6

EDWARD J. HARRIS
INVENTOR.

BY G. William Freeman
ATTORNEY.

United States Patent Office 3,041,667
Patented July 3, 1962

3,041,667
VULCANIZING PRESS
Edward J. Harris, 590 Delaware Ave., Akron, Ohio
Filed Aug. 27, 1959, Ser. No. 836,476
10 Claims. (Cl. 18—17)

This invention relates to the art of vulcanization of pneumatic tires and in particular has reference to improvements in automatic vulcanizing presses employed in the manufacture of such articles.

In the art of vulcanizing pneumatic tires, it has long been known that a pneumatic former can be automatically positioned interiorly of a flat built tire carcass to effectuate forming of the same to torroidal shape, followed by vulcanization and subsequent withdrawal of the former. Representative patents showing such vulcanizing presses are Soderquest Patents 2,495,663 and 2,495,664.

In the aforementioned patents, it will be noted that the pneumatic former is carried by the lower mold section so as to be positionable between the opposed mold sections when the relatively movable upper mold section moves into and out of closing contact with the lower mold section.

In applicant's copending application, Serial No. 690,675, now Patent No. 2,970,342 filed October 17, 1957, there was disclosed a pneumatic former that was carried by the relatively movable upper mold section and which projected and retracted with respect to the same during operation of the press. The operation of the press of the above referred to copending application was further characterized by the fact that the inflating medium was supplied to the interior of the former from the lower mold section through a fitting provided on the projecting end of the former that was carried by the upper mold section.

In applicant's copending application, Serial No. 765,386, the further improvement of spring loading the projecting nozzle of the former was disclosed, with this spring loaded projecting nozzle or fitting of the former serving to permit shifting of the former relatively of the lower mold section without breaking supply and exhaust connections therebetween.

While the devices of the above described copending applications have been satisfactory in most respects, it has been found that even further improved results can be obtained by making certain modifications and improvements to the structures of the above referred to copending applications.

First, it has been found that if condensate removal means of a more positive and effective nature are provided, that there will be no possibility of water entrapment during vulcanization, with the result that voids or other failures due to water entrapment will be eliminated.

Secondly, it has been found that if the supply and exhaust conduits are arranged in a sliding fashion, that there will be an improved operational life of the component parts due to the fact that such a sliding piston arrangement will have a longer operational life than would otherwise be the case.

Third, it has been found that if the bead seat that is associated with the upper mold section is normally urged away from the upper bead plate of the former, that an automatic stripping of the upper portion of the tire will occur automatically during opening of the press, with the result that all problems of stripping the tire from the mold will, in this fashion, be eliminated.

Fourth, it has been found that if the lower mold is provided with spring-loaded projecting locating pins, that these pins can be employed during loading of the press to insure proper seating of the tire with respect to the bead seat of the lower mold section, with the result that all possibility of tipping or cocking will be obviated.

Production of an improved vulcanizing press having the above advantages accordingly becomes the principal object of this invention, with other objects becoming more apparent upon a reading of the following brief specification, considered and interpreted in the light of the accompanying drawings.

Figure 2:
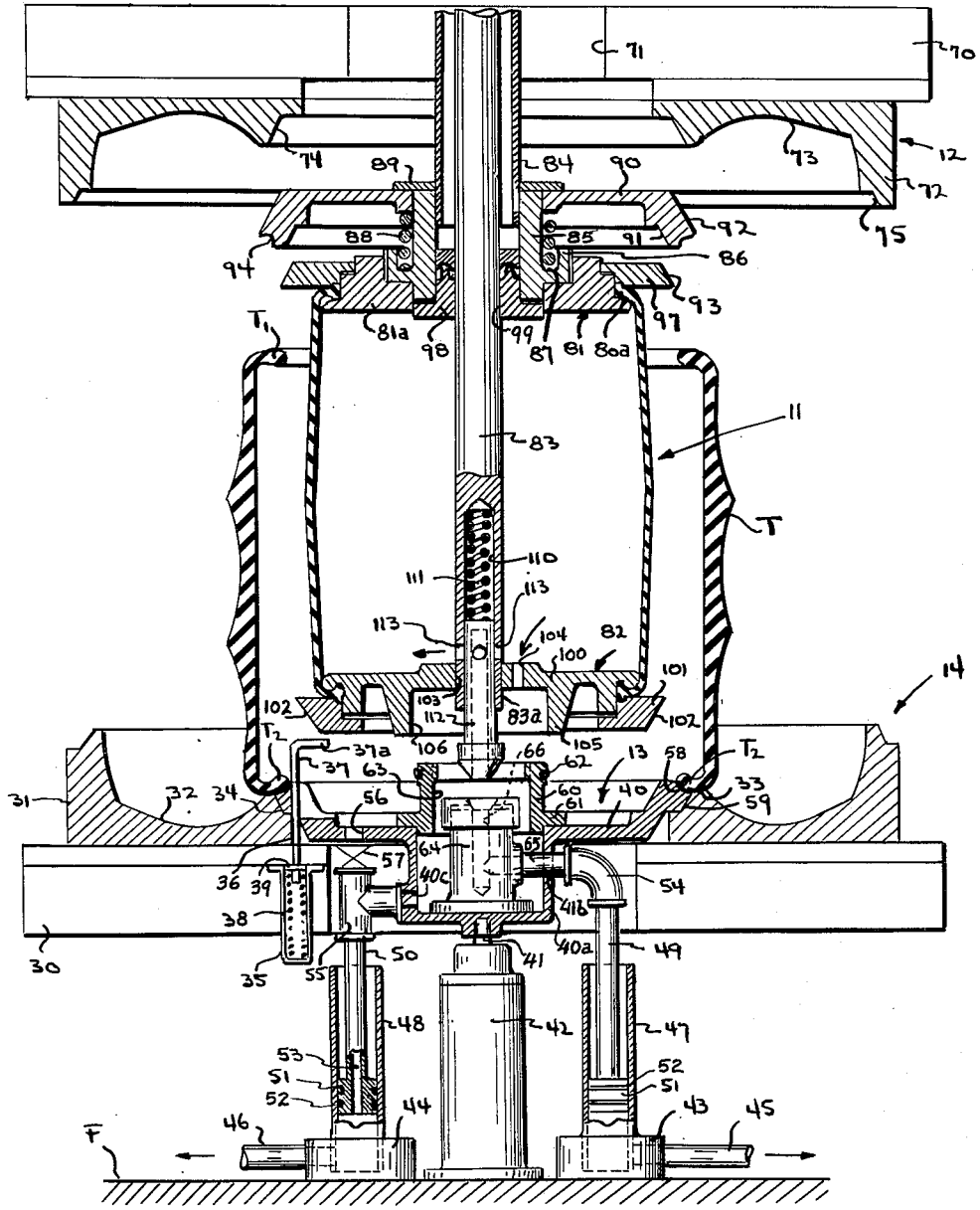
Figure 3:
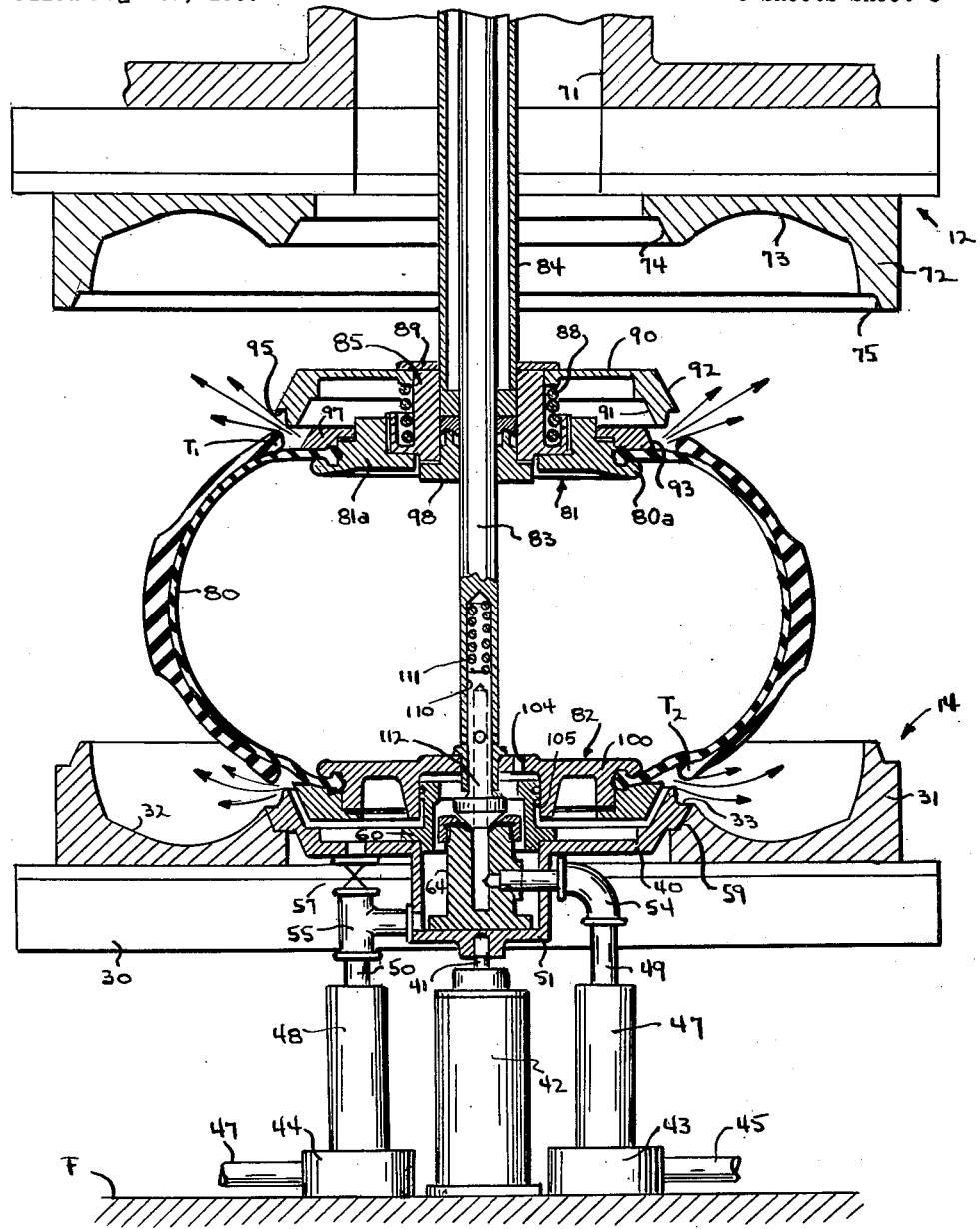
Figure 4:
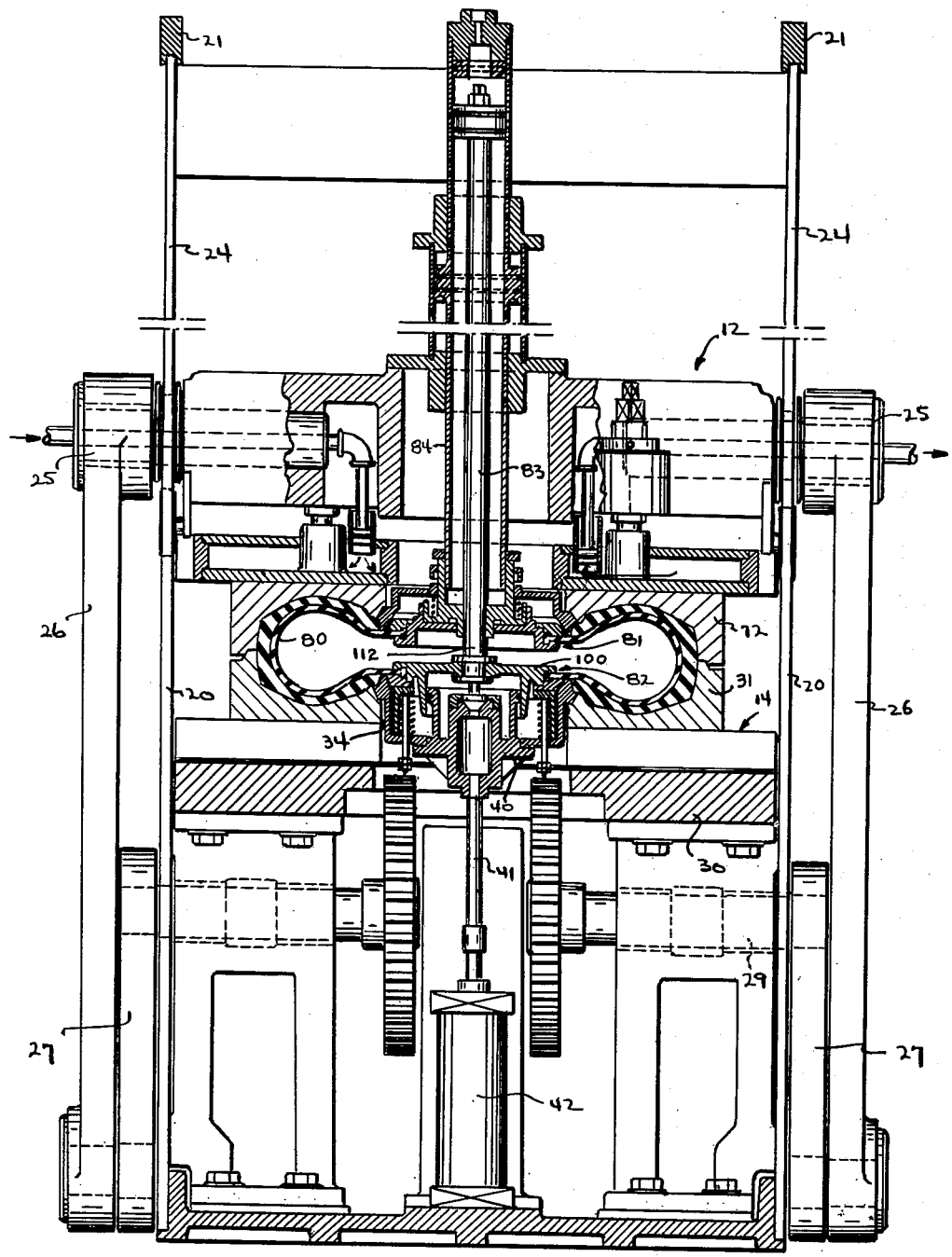
Figure 5:
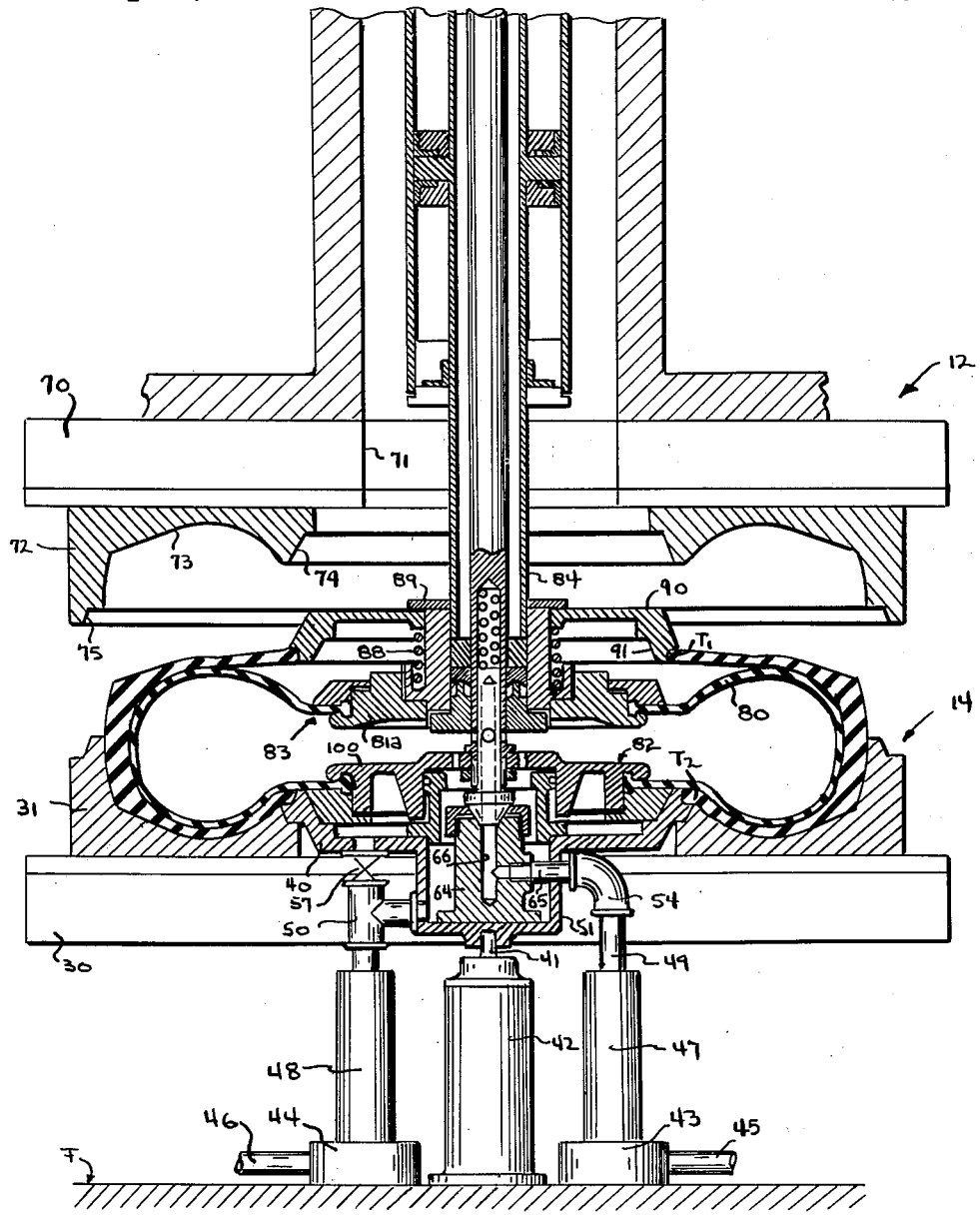
Figure 6:
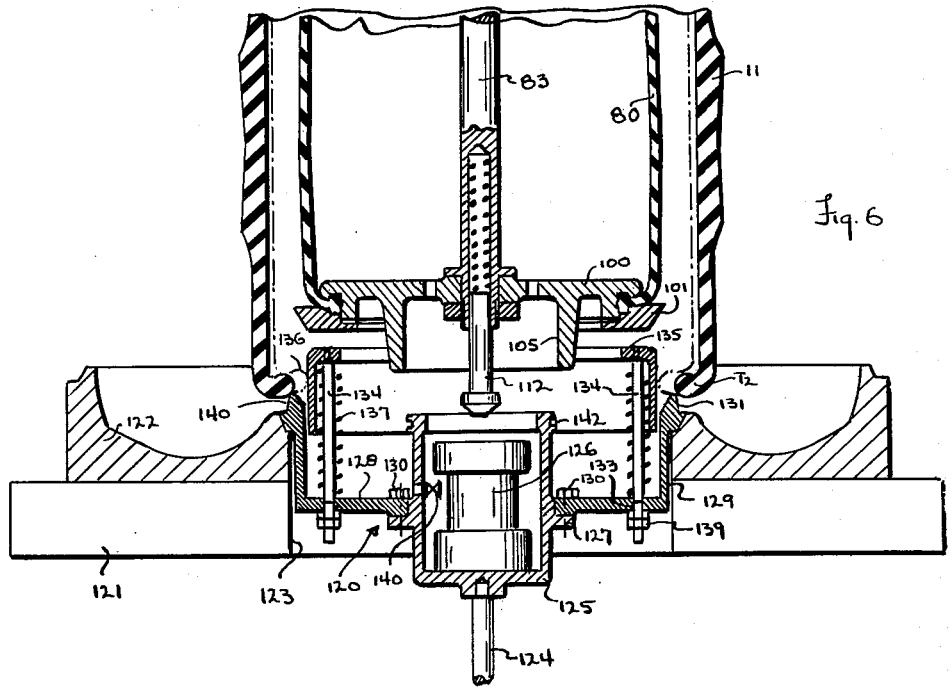
Figure 7:
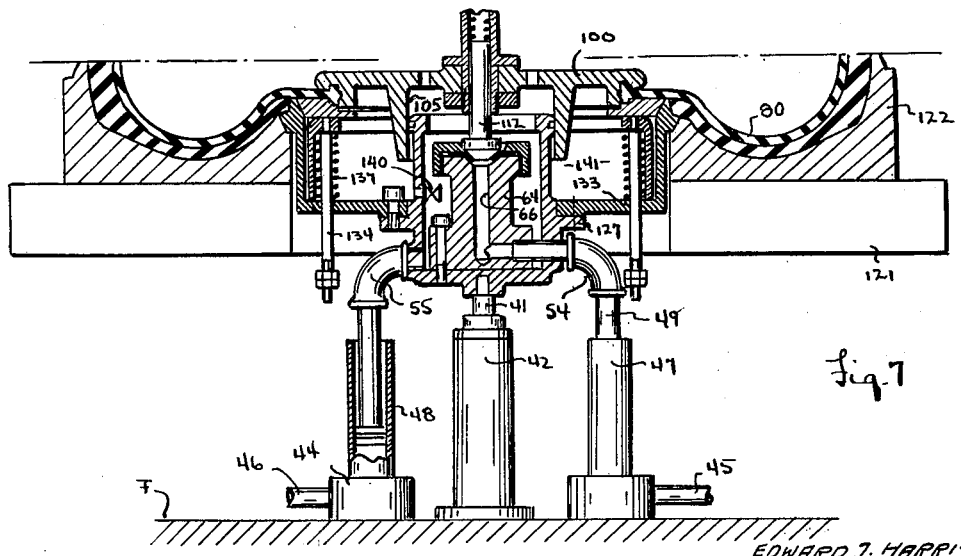

Of the drawings:
FIGURE 1 is a side elevation of the improved press.
FIGURE 2 is a sectional view partly broken away and in section and illustrating the position of the component parts during initial closing of the press.
FIGURE 3 is a view similar to FIGURE 2 but showing the position of the component parts during preliminary forming in closing of the press.
FIGURE 4 is a view similar to FIGURES 2 and 3 but showing the position of the component parts during the fully closed position.
FIGURE 5 is a view similar to FIGURES 2, 3 and 4 but showing the position of component parts during opening of the press.
FIGURES 6 and 7 are similar views showing a modification of the invention.

Referring now to the drawings, the improved vulcanizing press, generally designated by the numeral 10, is shown including a pneumatic former 11 that is shiftably carried by an upper mold section 12 so as to be capable of insertion and withdrawal with respect to a tire T that is supported on a bead ejector mechanism 13 of the lower mold section 14; the arrangement being such that the tire T will be deformed to the toroidal shape of FIGURES 3 and 4 upon closure of the mold sections 12 and 14 to the position of FIGURE 4. In order that the description of the component parts may be more readily understood, the same will be individually described.

The Press Structure

Referring now to FIGURE 1, the improved vulcanizing press 10 is shown including a pair of vertically extending opposed side plates 20, 20 that rigidly support therebetween a lower mold section 14. Each side plate 20 includes an upright extension 21 secured to each lower portion 22 thereof by bolts 23, 23, with the upright extensions 21, 21 having guide slots 24, 24 that receive guide pins 25, 25 that are connected to the upper mold section 12. In this fashion, the upper mold section 12 is journaled with respect to the slots 24, 24 of extensions 21, 21. The pins 25, 25 also project beyond the outer extent of the opposed plates 21, 21 and are, accordingly, also journaled with respect to opposed link arms 26, 26. The opposed ends of arms 26, 26 pivotally connect to crank arms 27, 27, with the crank arms 27, 27 being keyed, as at 28, to a shift 29 that is actuated through gearing (FIGURE 4) so as to be rotated by motor 29. In this manner, rotation of the motor 29 will either move the upper mold section 12 towards or from the lower mold section, dependent upon the direction of rotational movement, with guiding of the path of movement of mold section 12 being effectuated by the guide plates 21, 21 in the manner described and set forth in applicant's copending application, Serial No. 765,386, filed October 6, 1958.

The Lower Mold Section 14

Referring next to FIGURES 2, 3 and 4 for a consideration of the lower mold structure 14, it will be seen that the same includes a support plate 30 upon which is secured, in known fashion, a design imparting cavity half 31 that includes design imparting cavity surface 32, a bead seat 33 and an undercut 34 that coacts with the ejector means in the manner to be subsequently described.

In addition to the aforementioned component parts, the support plate 30 also carries a series of circumferentially arranged housings 35, 35, each of which is aligned with an opening 36 that is provided in the cavity 31. Each opening 36 serves to slidingly receive a pin 37 having an inturned end 37a and being urged to the projecting position of FIGURE 2 by a spring 38 that bears against a lower flange 39 that is secured thereto. Preferably, four of such pins are provided for projection beyond the design imparting surface of the cavity 31 for the purpose of aligning the tire as is clearly shown in FIGURE 2 of the drawings.

The Ejection Means 13

As has been indicated previously, the bead ejection means 13 are designed to move relatively of the lower mold section 13 for the purpose of lifting the finished tire out of contact with the design imparting cavity 31. To this end, the bead ejector means include a cylindrical plate member 40 that is secured to and actuated by the piston rod 41 of a piston 42, with piston 42 preferably being secured to the floor F as is clearly shown in FIGURES 2, 3 and 4 of the drawings.

Also supported on the floor F are base members 43 and 44 which are connected to a supply pipe 45 and an exhaust pipe 46; the arrangement being such that the members 43 and 44 further include upright tubular members 47 and 48, within which a supply fitting 49 and an exhaust fitting 50 may be received, with the supply fittings 49 and 50 each including a head portion 51 that is grooved for reception of O-rings 52. Further, fittings 49 and 50 are provided with a hollow interior bore 53 that serves to transfer the liquid between the press mechanism and the supply or exhaust pipes 45 and 46.

To this end, the plate 40 is shown provided with a projecting circular extension 40a that has openings 40b and 40c that respectively connect, through fittings 54 and 55, with supply pipe 49 and exhaust pipe 50. Further, an opening 56 is provided in the plate 40 and leads to a check valve that is schematically illustrated by the numeral 57, with this check valve providing unidirectional flow control and thus permitting medium to exhaust from opening 56 to line 50 while preventing the reverse situation where medium would flow from line 50 through port 56. Additionally, the peripheral edge of the plate 40 is contoured to define a partial bead seat 58 and a contoured peripheral edge portion 59 that is received in the undercut 34 of cavity 31.

Secured to the opening defined by the cylindrical projection 51 is a concentric tubular extension 60 that has a flange 61 that seats against plate 40 and which can be secured thereto in known fashion, as by welding. For the purposes to be described, the external periphery of the member 60 is provided with at least one O-ring 62, while the opening 63 thereof easily accommodates the projecting portions of the former 11 as is evident from FIGURE 2. Also seated in preferably concentrical relationship with the member 51, is a supply fitting 64 that connects with pipe 65 so as to receive fluid in an internal bore 66 thereof, with medium in bore 66 being ultimately transferred interiorly of former 11, as will presently be described.

The Upper Mold Section 12

The upper mold section 12 has been previously indicated as being journaled with respect to the ends of arms 26, 26 for the purpose of being complementally moved into and out of registry with the components of lower mold section 14.

Accordingly, the upper mold section 12 includes a support plate 70, centrally bored as at 71 and also having secured thereto a design imparting cavity 72 that includes a design imparting surface 73 and a tapered counter bore 74, with the peripheral edges 75 being also tapered for complemental engagement with like components of the design imparting cavity 31.

The Pneumatic Former 11

It has been previously indicated that the pneumatic former 11, with certain exceptions, corresponds in operation to the former mechanism disclosed in connection with applicant's copending application, Serial No. 765,386, filed October 6, 1958, and, accordingly, it suffices to say that, in essence, the former includes a bladder 80 having its opposed ends secured to upper and lower bead plate mechanisms generally designated by the numerals 81 and 82, respectively, with bead plate 82 being secured to pipe 83, while bead plate 81 is secured to pipe 84, with these pipes each being shiftable with respect to each other and plate 70 in the manner described in applicant's copending application, Serial No. 765,386, filed October 6, 1958.

Accordingly, reference is made to the above referred to copending application for a detailed consideration as to the mounting and positioning of the members 83 and 84 with respect to the upper mold section 12.

Considering next the detailed structure of the upper bead ring 81, it will be noted that the same includes a plate 81a that has secured thereto, as by welding, a sleeve 85 having a projecting flange 86 that defines a seat 87 for one end of a spring 88; the arrangement being such that flange 89 that is secured to pipe 84 limits the amount of axial shifting of a plate 90, with this plate normally being urged by spring 88 to the position of FIGURE 2 of the drawings, but with the seat portions 91 and 92 thereof moving into registry with tapered surfaces 93 and 74 of plates 97 and 90, respectively, upon movement of the press to the closed position of FIGURE 4. Additionally, plate 90 further includes a bead seat 94 that serves to engage the upper bead portion $T_1$ of tire T during movement to such closed position. It is believed sufficient to recite in connection with the remaining components, that concentric plates 81a and 97 coact to grip the upper end 80a of bladder 80 with these plates also being secured with respect to a guide sleeve 98 that has an opening 99 through which the shaft 83 may be slidingly received.

Considering next the structure of the lower bead ring structure 82, it will be seen that the same includes concentric plates 100 and 101, both of which are of generally circular configuration so as to grip lower bead 80b of bladder 80 in place therebetween. In addition to the aforementioned component parts, the plate 101 also includes a tapered edge 102 and a central opening 103 to which the lower end 83a of shaft 83 can be fixed for movement therewith. A through bore 104 is provided for the purpose of exhausting condensate from the interior of the bladder 80, as will become more apparent in the following paragraphs. Also, the plate 100 includes an axially projecting cylindrical housing 105 having an internal wall 106 that coacts with the bead ejector means 13 and, in this fashion, the projecting sleeve 105 can be telescoped over the sleeve 60 of bead ejector 13, with sealing being effectuated by the O-ring 62 acting against wall 106.

Also, and for the purpose of supplying inflation pressure to the interior of the bladder 80, the lower end 83a of shaft 83 is shown provided with a bore 110 within which may be received a spring 111 and a projecting fitting 112, with spring 111 normally urging fitting 112 to a maximum projection and with the usual stop being provided for limiting the extent of projection of the fitting 112. Radial bores 113, 113 are provided in the shaft 83 for communication with bore 114 that is provided interiorly of fitting 112, with bore 114 being in axial alignment with bore 66, as is clearly shown in FIGURES 2, 3 and 4 of the drawings. In this fashion, inflation medium from line 45 can be supplied interiorly of bladder 80.

The Operation of the Device

In use or operation of the improved vulcanizing press, it will first be assumed that the component parts have been assembled as indicated and that the bead ejector means 13 is in the retracted condition of FIGURE 2 so as to permit reception of the lower bead portion $T_2$ about the projecting pins 37.

At this time, the motor 29 can be actuated to the upper mold section into a parallel condition of approach with respect to the lower mold section 14 and at this time, proper mechanisms can be actuated to move the shafts 83 and 84 relatively of the upper mold section 12 so that the component parts are in the condition shown in FIGURE 2.

With the component parts positioned as shown in FIG-URE 2, it is merely necessary that final closing movement of the press 12 be started as by actuating motor 29 and, as such approach continues, it is believed manifest that the lower edge of plate 101 will first strike the inturned ends 37a, 37a of pins 37 and will serve to move the same into their housing 35 against the force of springs 38.

Also during such movement, the sleeve 105 will be telescoped around the projection 60, with O-rings 62 sealing against wall 106. When the lower bead mechanism has been seated as just described, the axially advancing bead seat 94 will approach the upper bead $T_1$ and at this time, the component parts are in the approximate condition of FIGURE 3.

When the component parts are positioned as shown in FIGURE 3, it is important to note that both ends of the tire are out of contact with the bead seats for the same, with the result that the tire, in actuality, is floating on the surface of the bladder 80, which is in a somewhat expanded condition. Due to this fact, there will be a complete evacuation of air from between the exterior of the former and the interior of the tire, with this air evacuation being indicated by the arrows in FIGURE 3 of the drawings. It will be noted in this regard that the separation of the tire beads with respect to the seats for the same will continue until further closing has been obtained.

With all trapped air evacuated as just described, the closing of the mold can be continued until the position of FIGURE 4 is reached, at which time inflation medium can be supplied from line 45 to the interior of bladder 80 by directing the same through base 43, supply pipe 49, fitting 54, supply pipe 65, bore 66 of fitting 64, bore 114 of fitting 112 and openings 113, 113. During the inflation, there will be extreme temperatures present and it is believed apparent that at such time, condensation will occur within the bladder 80. This condensation will emit from bladder 80 through opening 104 and will then be forced to pass into the interior of sleeve 60 due to the sealed connection between the external portion thereof and sleeve 105. The condensate so received interiorly of sleeve 60 will be forced to go through opening 53 into fitting 55 and supply line 50 and exhaust through line 46.

When the curing cycle has been completed, it is merely necessary that the mold sections be opened as described in applicant's copending application, Serial No. 765,386, filed October 6, 1958, and, accordingly, the mold section 12 will first be separated from the lower mold section 14, while the bead plates 81 and 82 are retained substantially in the extended condition of FIGURE 5, with such movement of mold section 12 relatively of the shafts 83 and 84 being accomplished by the mechanisms described in the above referred to copending application.

After initial separation of the mold sections, the component parts will be positioned approximately as shown in FIGURE 5 and at this time, it will be noted that the force of spring 88 will urge plate 90 axially away from plates 96 and 97 so that the former will, in effect, be stripped with respect to the upper internal portion of the tire. At this time, the mold sections can be further separated to the point where the shaft 84 will move with the upper mold section 12 and, at this point, the bladder will be stripped from the interior of the tire automatically due to the movement of the plate 81 relatively of the bead plate 82. After a certain amount of such relative movement, the bead plate 82 will also move with the upper mold section 12 to result in complete stripping of the former from the interior of the tire.

At this point, the bead ejector means 13 may be operated as by actuation of piston 41 and the cured tire will be separated from the lower design imparting surface 32 and positioned in a spaced condition therefrom and easily removed with the tire being retained in place until removed by the pins 37, 37, which will automatically project out upon separation between the lower bead plate 82 and the bead ejector mechanism 13.

Upon reinsertion of another tire, the above cycle of operating events may be repeated.

The modified form of the invention shown in FIGURES 6 and 7 is concerned with a modified form of bead ejector mechanism and, accordingly, it is to be understood that the modified bead ejector mechanism, generally designated by the numeral 120, will operate equally well with the former 11 and the component parts thereof that have been previously described in connection with FIGURES 1 through 5. Accordingly, like numerals have been applied to like parts previously described.

As before, a lower mold section 121 has a design imparting cavity 122 second thereto, with both the mold section and design imparting cavity being centrally apertured, as at 123, to provide an opening within which the bead ejector mechanism 120 may move.

In basic essence, the principal changes in the modification are two-fold.

First, provision is made for ready detachment between the bead ring and the main supply chamber.

Secondly, means are provided for obviating cocking of the tire during loading.

To these ends, the upper end of a piston 124 is shown receiving a cylindrical housing 125, within which a supply fitting 126 may be received for coaction with the projecting end 112 of former 11, with these component parts being similar to the component parts previously described in connection with FIGURES 1 to 5 of the drawings. Thus, the housing 125 receives supply and exhaust pipes 49 and 50 through fittings 54 and 55, as before.

In addition to the aforementioned component parts, the housing 125 is provided with a radially projecting flange 127 to which the radial web 128 of a ring member 129 may be secured as by bolts 130, 130. The one axial end of the ring 129 is contoured to define a bead seat 131 that will receive the lower bead portion $T_2$ of a tire T, as shown in FIGURE 6 of the drawings.

For the purpose of adjustment, the radial web 128 is provided with a series of apertures 133, 133 within which may be slidably received a series of bolts 134, 134, with the opposite ends of these bolts being secured to the radial web 135 of a concentric ring 136; the arrangement being such that springs 137, 137 continually urge the ring 136 away from the ring 129, with the extent of such axial separation being limited by adjustment nuts 139, 139 that are provided on one end of the shafts 134, 134. Additionally, the ring 129 is further provided with a tapered axial end 140 for complemental engagement with the tapered surface of previously described ring 101, with this arrangement of component parts being best illustrated in FIGURE 7 of the drawings. An O-ring 142 is provided at the axial end of housing 124 for sealing engagement with the internal wall of cylindrical housing 105.

In addition to the aforementioned component parts, the housing 125 is also provided with a check valve 140 that communicates the interior of housing 125, with a chamber 141 that is defined by the component parts when the same are positioned as shown in FIGURE 7. This check valve 140 prevents flow from the interior of housing 125 to chamber 141 but permits flow in the opposite direction. This is desirable because of the fact that during vulcanization there will be a certain amount of air trapped in chamber 141, with such trapped air becoming pressurized by the heat of vulcanization during the curing cycle. During vulcanization, however, this air cannot escape through check valve 140 due to the opposing pressure inside bladder 80 and housing 121. However, when the internal pressure within the bladder 80 is released, the pressurized air in chamber 141 will escape through check valve 140 to avoid premature shifting of bead engaging ring 82 from design imparting cavity 122.

In use or operation, the component parts operate as before and it will be noted that during closure, the ring 136 will be telescoped within ring 129 by virtue of the contact with advancing ring 101, with the fully closed position of the component parts being best shown in FIGURE 7.

However, when vulcanization is completed and the lower bead ring 82 is separated as previously described, the force of springs 137 will again urge the ring 136 outwardly to the position of FIGURE 6. Following this operation, piston 42 will unseat the bead seat 131 to space the tire from the lower mold section.

It will be further noted that if it is desired to change bead ring diameters for effectuating cure on a different sized tire, that it is merely necessary that the bolts 130, 130 be loosened and the ring 129 together with ring 136 be separated from the housing 125.

While a full and complete disclosure of the invention has been set forth in accordance with the dictates of the patent statutes, it is to be understood that the invention is not intended to be limited to the specific embodiments herein disclosed.

Accordingly, where appropriate, modifications of the invention may be resorted to without departing from the spirit hereof or the scope of the appended claims.

What is claimed is:

1. A vulcanizing press of the character described, comprising; first and second complemental mold sections movable relatively of each other between open and closed positions with said mold sections defining an annular curing chamber when closed; former supporting means shiftably carried by said first mold section; a pneumatic former having axial ends that are secured to said former supporting means with said former projecting axially of said first mold section towards said second mold section; means for shifting both axial ends of said former relatively of said first mold section to a condition of projection beyond the same; a bead seat carried by said former supporting means and being positioned between said former and said first mold section in substantial concentricity therewith; and means for urging the axial end of said former that is adjacent said first mold section away from said bead seat.

2. A vulcanizing press of the character described, comprising; first and second complemental mold sections movable relatively of each other between open and closed positions with said mold sections defining an annular curing chamber when closed; former supporting means shiftably carried by said first mold section; a pneumatic former having axial ends that are secured to said former supporting means with said former projecting axially of said first mold section towards said second mold section; means for shifting both axial ends of said former relatively of said first mold section to a condition of projection beyond the same; a bead seat carried by said former supporting means and being positioned between said former and said first mold section in substantial concentricity therewith; and means for tensionally urging said bead seat and said former end adjacent thereto apart.

3. The device of claim 2 further characterized by the fact that said bead seat is movable into and out of seated engagement with said first mold section.

4. A vulcanizing press of the character described, comprising; first and second complemental mold sections movable relatively of each other between open and closed positions with said mold sections defining an annular curing chamber when closed; former supporting means shiftably carried by said first mold section; a pneumatic former having axial ends that are secured to said former supporting means with said former projecting axially of said first mold section towards said second mold section; a bead seat defined by said second mold section and adapted to receive a flat built tire carcass thereon; and guide means shiftably carried by and projecting axially of said second mold section towards said first mold section; and means for tensionally urging said guide means to maximum projection beyond said second mold section; said guide means concentrically aligning said uncured carcass with respect to said bead seat of said second mold section.

5. The device of claim 4 further characterized by the fact that said guide means include a series of pins arranged in parallelism and in a circular course around the axis of said second mold section.

6. The device of claim 4 further characterized by the fact that said guide means are retracted by the projecting end of said former during closure of said press.

7. A vulcanizing press of the character described, comprising; first and second complemental mold sections movable relatively of each other between open and closed positions with said mold sections defining an annular curing chamber when closed; former supporting means shiftably carried by said first mold section; a pneumatic former having axial ends that are secured to said former supporting means with said former projecting axially of said first mold section towards said second mold section; fluid supply means carried by said second mold section; exhaust means carried by said second mold section; connecting means carried by the projecting end of said former and releasably interconnecting with said fluid supply means, whereby fluid from said supply means may be delivered to the interior of said former upon interconnection of said supply means and said connecting means; complemental ring members respectively carried by the projecting end of said former and said second mold section; said ring members telescoping together in sealing relationship during closure of said press; said ring members encircling said connected supply and connecting means and being spaced radially inwardly from the peripheral edges of the former when telescoped; said ring members communicating the interior of said former with said exhaust means during the period that the same are telescoped in sealing relationship.

8. The device of claim 7 further characterized by the fact that said second mold section includes a bead seat that is shiftable relatively thereof.

9. The device of claim 8 further characterized by the fact that said bead seat supports said fluid supply and said exhaust means.

10. The device of claim 9 further characterized by the fact that said supply and exhaust means can move relatively of supply and exhaust sources that are fixed with respect to said press.

References Cited in the file of this patent

UNITED STATES PATENTS 2,736,059    Frank _____ Feb. 28, 1956
2,775,789    Soderquist _____ Jan. 1, 1957